(12) United States Patent
Yao et al.

(10) Patent No.: US 11,795,086 B2
(45) Date of Patent: Oct. 24, 2023

(54) COMBINED WASTE WATER AND GAS TREATMENT SYSTEM FOR EFFICIENTLY DECARBONIZING AND REMOVING NITROGEN

(71) Applicant: BEIJING JIAOTONG UNIVERSITY, Beijing (CN)

(72) Inventors: Hong Yao, Beijing (CN); Lu Lu, Beijing (CN); Sheng Tian, Beijing (CN)

(73) Assignee: BEIJING JIAOTONG UNIVERSITY

( * ) Notice: Subject to any disclaimer, the term of this patent is extended or adjusted under 35 U.S.C. 154(b) by 204 days.

(21) Appl. No.: 17/530,450

(22) Filed: Nov. 18, 2021

(65) Prior Publication Data

US 2022/0177343 A1   Jun. 9, 2022

(30) Foreign Application Priority Data

Dec. 4, 2020   (CN) .......................... 202011408239.4

(51) Int. Cl.
*C02F 9/00*   (2023.01)
*B01D 53/32*   (2006.01)
(Continued)

(52) U.S. Cl.
CPC .............. *C02F 9/00* (2013.01); *B01D 53/326* (2013.01); *B01D 53/62* (2013.01); *B01D 53/85* (2013.01);
(Continued)

(58) Field of Classification Search
CPC .. C02F 9/00; C02F 3/005; C02F 3/284; C02F 3/2846; C02F 3/307; C02F 2203/006;
(Continued)

(56) References Cited

U.S. PATENT DOCUMENTS

2022/0177342 A1*  6/2022 Yao .......................... C02F 9/00

FOREIGN PATENT DOCUMENTS

CN   106045031 A  * 10/2016
CN   110171904 A  *  8/2019
(Continued)

OTHER PUBLICATIONS

Translation of JP2000229229A_Tsukada (Year: 2000).*
(Continued)

*Primary Examiner* — Ekandra S. Miller-Cruz
(74) *Attorney, Agent, or Firm* — Fishman Stewart PLLC

(57) ABSTRACT

A combined waste water and gas treatment system for efficiently decarbonizing and removing nitrogen, including a water feeding pump, a carbon capture device, an intermediate water tank, and an anaerobic ammonium oxidation reactor connected in sequence through pipelines, where the carbon capture device includes an anode chamber and a cathode chamber; an anode plate is arranged in the anode chamber; a cathode plate is arranged in the cathode chamber; a gas inlet pipe is further arranged at the cathode chamber; an air compressor is connected with the gas inlet pipe; a gas outlet pipe is arranged at a top of the carbon capture device; a water outlet in the intermediate water tank is fluidly communicated with a bottom end of the anaerobic ammonium oxidation reactor through a second water inlet pipe; the gas outlet pipe is fluidly communicated with the second water inlet pipe.

6 Claims, 1 Drawing Sheet

(51) Int. Cl.
  *B01D 53/62* (2006.01)
  *B01D 53/85* (2006.01)
  *C02F 3/00* (2023.01)
  *C02F 3/28* (2023.01)
  *C02F 3/30* (2023.01)

(52) U.S. Cl.
  CPC .. *B01D 2255/806* (2013.01); *B01D 2257/504* (2013.01); *B01D 2258/0283* (2013.01); *C02F 3/005* (2013.01); *C02F 3/284* (2013.01); *C02F 3/2846* (2013.01); *C02F 3/307* (2013.01); *C02F 2203/006* (2013.01); *C02F 2209/14* (2013.01)

(58) Field of Classification Search
  CPC ........ C02F 2209/14; C02F 1/463; C02F 1/66; C02F 2101/20; C02F 2201/46115; C02F 3/2833; C02F 3/2866; C02F 2209/08; B01D 53/326; B01D 53/62; B01D 53/85; B01D 2255/806; B01D 2257/504; B01D 2258/0283; B01D 2251/402; B01D 2251/404; B01D 2257/40; B01D 2257/404; B01D 2257/406; B01D 2258/06; B01D 53/30; Y02C 20/40
  USPC .......................................................... 210/85
  See application file for complete search history.

(56) References Cited

FOREIGN PATENT DOCUMENTS

| | | | | |
|---|---|---|---|---|
| CN | 111924807 | A | * | 11/2020 |
| EP | 2321229 | B1 | * | 7/2013 |
| JP | 2000229229 | A | * | 8/2000 |

OTHER PUBLICATIONS

Translation of CN111924807A_NING (Year: 2020).*
Translation of CN106045031A_Peng031 (Year: 2016).*
Translation of CN110171904A_Peng904 (Year: 2019).*
Translation of EP2321229B1_Blum (Year: 2013).*

* cited by examiner

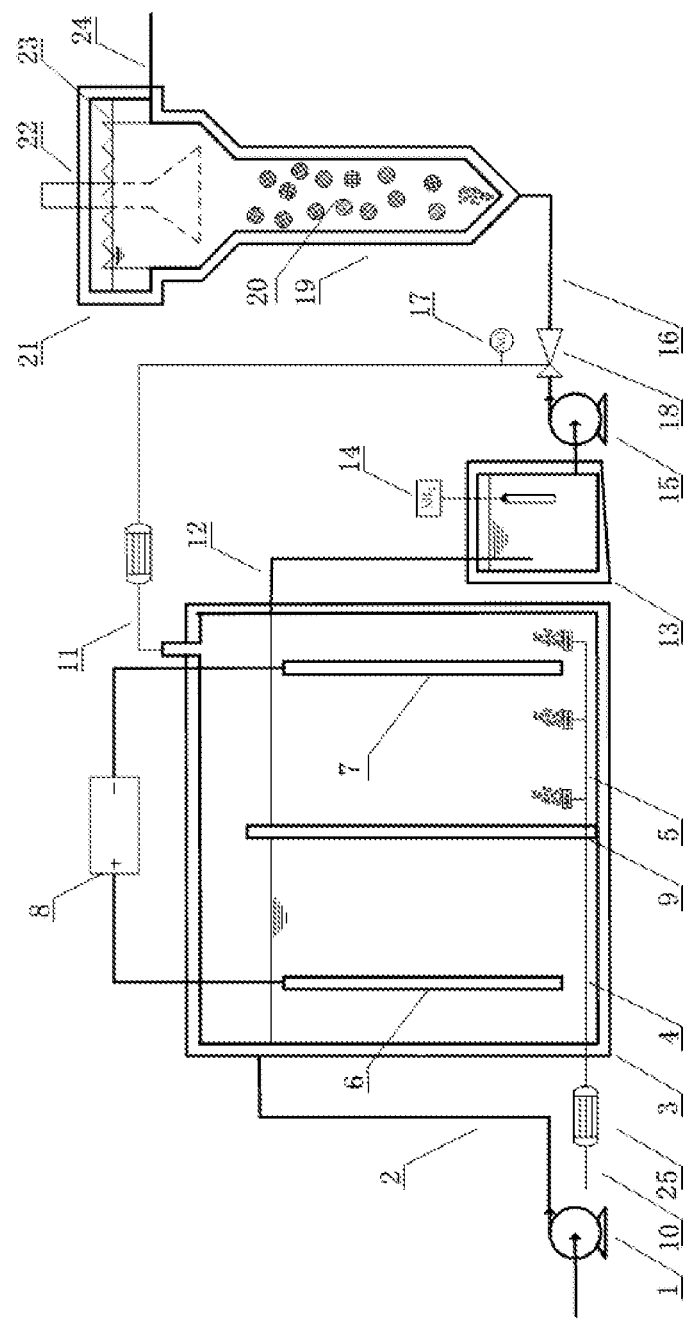

COMBINED WASTE WATER AND GAS TREATMENT SYSTEM FOR EFFICIENTLY DECARBONIZING AND REMOVING NITROGEN

CROSS REFERENCE TO RELATED APPLICATION

This patent application claims the benefit and priority of Chinese Patent Application No. 202011408239.4, entitled "Combined Waste Water and Gas Treatment System for Efficiently Decarbonizing and Removing Nitrogen" filed on Dec. 4, 2020, the disclosure of which is incorporated by reference herein in its entirety as part of the present application.

TECHNICAL FIELD

The present disclosure relates to the technical field of waste water and gas treatment, and in particular, to a combined waste water and gas treatment system for efficiently decarbonizing and removing nitrogen.

BACKGROUND

With rapid development of economy and rapid improvement of industrial level of China, a large amount of nitrogen-containing industrial waste water is discharged into a water body, resulting in serious problems, such as water body eutrophication and ecosystem degradation of rivers, lakes, etc. And, industrial production produces a large amount of waste gas, and the emission of carbon dioxide and nitric oxide exacerbates the greenhouse effect and destroys the ecological environment.

Currently, the most widely used waste water denitrification technology is a biological denitrification technology, which assimilates nitrogen source pollutants in the waste water by utilizing the growth and metabolism of nitrifying bacteria and denitrifying bacteria, to realize the removal of the pollutants. Restricted by the metabolic rate of microorganisms themselves, the traditional biological denitrification technology is low in treatment efficiency, large in structure occupation area, and high in operating cost. A novel biological denitrification technology represented by anaerobic ammonium oxidation gets more and more attention. Anaerobic ammonium oxidation bacteria are autotrophic microorganisms. The anaerobic ammonium oxidation for nitrogen removal does not need an organic carbon source, and organic matters, suspended matters, and toxic substances in inlet water will interfere with a subsequent anaerobic ammonium oxidation process. Therefore, it is necessary to treat organic carbon in the industrial waste water first. However, factory flue gas contains a large amount of carbon dioxide and nitric oxide, so special flue gas treatment processes, such as an absorption method and an SCR technology, are required, which increases the treatment cost, and causes waste on a carbon source and a nitrogen source contained therein.

SUMMARY

The objective of the present disclosure is to provide a combined waste water and gas treatment system for efficiently decarbonizing and removing nitrogen, so as to solve the above-mentioned problems in the prior art, and realize combined treatment of waste water and gas.

To achieve the above-mentioned objective, the present disclosure provides the following solutions:

The present disclosure provide a combined waste water and gas treatment system for efficiently decarbonizing and removing nitrogen, including a water feeding pump, a carbon capture device, an intermediate water tank, and an anaerobic ammonium oxidation reactor connected in sequence through pipelines, where the carbon capture device is of a fully enclosed structure and includes an anode chamber fluidly communicated with the water feeding pump through a water inlet pipe, and a cathode chamber fluidly communicated with the intermediate water tank through a first water outlet pipe; the anode chamber is separated from the cathode chamber through an ion exchange resin layer; an anode plate electrically connected to a positive electrode of a power supply is arranged in the anode chamber; a cathode plate electrically connected to a negative electrode of the power supply is arranged in the cathode chamber; a gas inlet pipe is further arranged at a bottom of the cathode chamber; an air compressor is connected with the gas inlet pipe; a gas outlet pipe is arranged at a top of the carbon capture device; a water outlet in a bottom of the intermediate water tank is fluidly communicated with a bottom end of the anaerobic ammonium oxidation reactor through a second water inlet pipe; the gas outlet pipe is fluidly communicated with the second water inlet pipe; the anaerobic ammonium oxidation reactor is an upflow anaerobic sludge bed; a three-phase separator is arranged at a top end of the anaerobic ammonium oxidation reactor.

Preferably, a lifting pump is arranged at one end, close to the intermediate water tank, of the second water inlet pipe; the lifting pump is configured for lifting water flowing out of the intermediate water tank.

Preferably, a gas pump is connected with the gas outlet pipe; a jet device is arranged at one end, close to the second water inlet pipe, of the gas outlet pipe.

Preferably, the three-phase separator includes an overflow weir arranged at the top end of the anaerobic ammonium oxidation reactor; an exhaust port is formed in a top end of the three-phase separator; a side part of the three-phase separator is connected to a second water outlet pipe.

Preferably, an on-line ammonia-nitrogen monitoring device is arranged in the intermediate water tank.

Preferably, an on-line NO monitor is further arranged on the gas outlet pipe.

Compared with the prior art, some embodiments achieves the following technical effects:

The combined waste water and gas treatment system for efficiently decarbonizing and removing nitrogen of the present disclosure realizes the combined treatment of the waste water and the waste gas. The combined waste water and gas treatment system for efficiently decarbonizing and removing nitrogen of the present disclosure can effectively remove chemical oxygen demand (COD) from the waste water and realize the capture of $CO_2$ in the waste gas, through a front carbon capture device, namely, a micellar electrokinetic capillary chromatography (MECC) process. Experiments show that MECC can capture more than 95% of the $CO_2$ produced by the biodegradation of organic matters in a process of removing the organic matters (the removal rate of COD is greater than 90%), and the carbon capture rate of the simulated flue gas (the concentration of $CO_2$ is 5 to 15%) input by an external source can also reach 80 to 93%. The coulomb efficiency of the reaction (the efficiency of converting the organic matters into electric current) is 80 to 82%. The hydrogen production efficiency of the cathode (the efficiency of converting the electric current into hydrogen) is 91 to 95%. The combined waste water and gas treatment system for efficiently decarbonizing and removing nitrogen of the present disclosure determines proper gas-water ratio and reactor residence time by monitoring NO in the waste gas and monitoring ammonia nitrogen in the waste water, and achieves a good removal effect of the nitrogen source pollutants on the premise of fully mixing gas and water through the jet device.

To describe the technical solutions in the embodiments of the present disclosure or in the prior art more clearly, the following briefly describes the accompanying drawings used for describing the embodiments. Apparently, the accompanying drawings in the following description are merely some embodiments of the present disclosure, and those of ordinary skill in the art may still derive other drawings from these accompanying drawings without creative efforts.

BRIEF DESCRIPTION OF THE DRAWINGS

The FIGURE is a schematic structural diagram of a combined waste water and gas treatment system for efficiently decarbonizing and removing nitrogen according to the present disclosure.

DETAILED DESCRIPTION

Reference signs in drawings: 1 water feeding pump; 2 first water inlet pipe; 3 carbon capture device; 4 anode chamber; 5 cathode chamber; 6 anode plate; 7 cathode plate; 8 power supply; 9 ion exchange resin layer; 10 gas inlet pipe; 11 gas outlet pipe; 12 first water outlet pipe; 13 intermediate water tank; 14 on-line ammonia-nitrogen monitoring device; 15 lifting pump; 16 second water inlet pipe; 17 on-line NO monitor; 18 jet device; 19 anaerobic ammonium oxidation reactor; 20 filler; 21 three-phase separator; 22 exhaust port; 23 overflow weir; 24 second water outlet pipe and 25 air compressor.

The technical solutions in the embodiments of the present disclosure will be clearly and completely described herein below with reference to the accompanying drawings in the embodiments of the present disclosure. Apparently, the described embodiments are merely part rather than all of the embodiments of the present disclosure. On the basis of the embodiments of the present disclosure, all other embodiments obtained by those of ordinary skill in the art without creative work fall within the protection scope of the present disclosure.

The objective of some embodiments is to provide a combined waste water and gas treatment system for efficiently decarbonizing and removing nitrogen, so as to solve the above-mentioned problems in the prior art, and realize combined treatment of waste water and gas.

In order to make the above objective, features, and advantages of the present disclosure more apparent and more comprehensible, the present disclosure is further described in detail below with reference to the accompanying drawings and specific implementation manners.

As shown in the FIGURE, an embodiment of the present disclosure provides a combined waste water and gas treatment system for efficiently decarbonizing and removing nitrogen, which includes a water feeding pump 1, a carbon capture device 3, an intermediate water tank 13, and an anaerobic ammonium oxidation reactor 19 connected in sequence through pipelines.

The carbon capture device 3 is of a fully enclosed structure. The carbon capture device 3 includes an anode chamber 4 fluidly communicated with a water feeding pump 1 through a water inlet pipe, and a cathode chamber 5 fluidly communicated with an intermediate water tank 13 through a first water outlet pipe 12. The anode chamber 4 is separated from the cathode chamber 5 by an ion exchange resin layer 9. An anode plate 6 electrically connected to a positive electrode of a power supply 8 is arranged in the anode chamber 4. A cathode plate 7 electrically connected to a negative electrode of the power supply 8 is arranged in the cathode chamber 5. A gas inlet pipe 10 is further arranged at the bottom of the cathode chamber 5. An air compressor 25 is connected with the gas inlet pipe 10. A gas outlet pipe 11 is arranged at the top of the carbon capture device 3.

The intermediate water tank 13 is used for regulating water quality and water quantity, and has an on-line ammonia-nitrogen monitoring device 14 arranged therein. A water outlet in a bottom of the intermediate water tank 13 is fluidly communicated with a bottom end of the anaerobic ammonium oxidation reactor 19 through a second water inlet pipe 16. A lifting pump 15 is arranged at one end of the second water inlet pipe 16 which is close to the intermediate water tank 13. The lifting pump 15 is used for lifting the water flowing out of the intermediate water tank 13. The gas outlet pipe 11 is fluidly communicated with the second water inlet pipe 16. A gas pump and an on-line NO monitor 17 are arranged on the gas outlet pipe 11, a jet device 18 is arranged at one end of the gas outlet pipe 11 which is close to the second water inlet pipe 16. The gas in the gas outlet pipe 11 flows into the second water inlet pipe 16 through the jet device 18 after the pressurization of a gas pump, so that the water flowing into the second water inlet pipe 16 form uniform and fine air bubbles, and the waste water in the second water inlet pipe 16 can be in full contact with and can adequately react with subsequent anaerobic ammonium oxidation bacteria.

The anaerobic ammonium oxidation reactor 19 is an upflow anaerobic sludge bed, which is internally provided with fillers 20 at a filling rate of 30 to 40%. The filler 20 is attached with anaerobic ammonium oxidation sludge. The anaerobic ammonium oxidation sludge is rich in anaerobic ammonium oxidation bacteria, which absorb ammonia nitrogen from the waste water and NO from the waste gas, and generates nitrogen through the action of themselves, to realize the removal of nitrogen source pollutants from the waste water and the waste gas. A three-phase separator 21 is arranged at a top end of the anaerobic ammonium oxidation reactor 19. The three-phase separator 21 includes an overflow weir 23 arranged at the top end of the anaerobic ammonium oxidation reactor 19. An exhaust port 22 is formed in top end of the three-phase separator 21. A side part of the three-phase separator is connected to a second water outlet pipe 24.

A working process of the combined waste water and gas treatment system for efficiently decarbonizing and removing nitrogen according to the embodiment is as follows.

The waste water enters the anode chamber 4 in the carbon capture device 3 (MECC) through the water feeding pump 1 and the first water inlet pipe 2 after pretreatment. The organic matters in the waste water are degraded by using electroactive bacteria (EAB) grown in the anode plate 6, to produce electrons and $H^+$. An industrial mineral waste is added into the anode chamber 4, and can be dissolved by the $H^+$-rich anode electrolyte to generate metal ions ($Ca^{2+}$, $Mg^{2+}$, etc.). Then, the waste water enters the cathode chamber 5 through the ion exchange resin layer 9, and meanwhile, $CO_2$-containing flue gas is introduced by the air compressor 25 through the gas inlet pipe 10. The electrons are collected by the anode, are transferred to the cathode plate 7 through an external circuit, and are used for reducing water to produce $H^2$ and $OH^-$. The metal ions are combined with the OH⁻ to form metal hydroxides when being migrated to cathode electrolyte through the ion exchange resin layer 9. The metal hydroxides are used for absorbing $CO_2$ and converting the $CO_2$ into stable carbonate precipitation, thereby realizing the capture of carbon. The water flowing out of the top of the carbon capture device 3 enters the intermediate water tank 13 through the first water outlet pipe 12. The on-line ammonia-nitrogen monitoring device 14 is observed, and the water quality and the water quantity of the intermediate water tank 13 are adjusted. The water flowing out of the intermediate water tank 13 enters the anaerobic ammonium oxidation reactor 19 through the second water outlet pipe 24 under the action of the lifting pump 15. The anaerobic ammonium oxidation bacteria in the anaerobic ammonium oxidation reactor 19 absorb the ammonia nitrogen from the waste water and the NO from the waste gas, and generate nitrogen through the action of themselves to realize the removal of nitrogen source pollutants from the waste water and the waste gas. Purified waste gas is exhausted from the exhaust port 22, the waste water flows up to the top of the anaerobic ammonium oxidation reactor 19, then is subjected to mud-water separation through the overflow weir 23, and subsequently enters the second water outlet pipe 24 for discharging.

In the descriptions of the present disclosure, it should be noted that orientations or positional relationships indicated by the terms "top", "bottom", etc. is an orientation or positional relationship shown in the accompanying drawings, and are merely for the convenience of describing the present disclosure and simplifying the description, rather than indicating or implying that the devices or elements must have a particular orientation, and be constructed and operated in the particular orientation. Thus, it cannot be construed as a limitation to the present disclosure. In addition, terms "first" and "second" are merely used for description, and cannot be understood as indicating or implying relative importance.

Specific examples are applied in the specification to illustrate the principle and implementation mode of the present disclosure. The description of the above embodiments is only used to help understand the method and core idea of the present disclosure. For those of ordinary skill in the art, according to the idea of the present disclosure, there will be changes in the specific implementation mode and application scope. In conclusion, the content of the present specification shall not be construed as a limitation to the present disclosure.

What is claimed is:

1. A combined waste water and gas treatment system for efficiently decarbonizing and removing nitrogen, comprising: a water feeding pump, a carbon capture device, an intermediate water tank, and an anaerobic ammonium oxidation reactor connected in sequence, wherein the carbon capture device is of a fully enclosed structure and comprises an anode chamber fluidly communicated with the water feeding pump through a water inlet pipe, and a cathode chamber fluidly communicated with the intermediate water tank through a first water outlet pipe; the anode chamber is separated from the cathode chamber through an ion exchange resin layer; an anode plate electrically connected to a positive electrode of a power supply is arranged in the anode chamber; a cathode plate electrically connected to a negative electrode of the power supply is arranged in the cathode chamber; a gas inlet pipe is further arranged at a bottom of the cathode chamber; an air compressor is connected with the gas inlet pipe; a gas outlet pipe is arranged at a top of the carbon capture device; a water outlet in a bottom of the intermediate water tank is fluidly communicated with a bottom end of the anaerobic ammonium oxidation reactor through a second water inlet pipe; the gas outlet pipe is fluidly communicated with the second water inlet pipe; the anaerobic ammonium oxidation reactor is an upflow anaerobic sludge bed; a three-phase separator is arranged at a top end of the anaerobic ammonium oxidation reactor.

2. The combined waste water and gas treatment system for efficiently decarbonizing and removing nitrogen according to claim 1, wherein a lifting pump is arranged at one end, close to the intermediate water tank, of the second water inlet pipe; the lifting pump is configured for lifting water flowing out of the intermediate water tank.

3. The combined waste water and gas treatment system for efficiently decarbonizing and removing nitrogen according to claim 2, wherein a gas pump is connected with the gas outlet pipe; a jet device is arranged at one end, close to the second water inlet pipe, of the gas outlet pipe.

4. The combined waste water and gas treatment system for efficiently decarbonizing and removing nitrogen according to claim 1, wherein the three-phase separator comprises an overflow weir arranged at the top end of the anaerobic ammonium oxidation reactor; an exhaust port is formed in a top end of the three-phase separator; a side part of the three-phase separator is connected to a second water outlet pipe.

5. The combined waste water and gas treatment system for efficiently decarbonizing and removing nitrogen according to claim 1, wherein an on-line ammonia-nitrogen monitoring device is arranged in the intermediate water tank.

6. The combined waste water and gas treatment system for efficiently decarbonizing and removing nitrogen according to claim 1, wherein an on-line NO monitor is further arranged on the gas outlet pipe.

* * * * *